(12) United States Patent
Momonoi et al.

(10) Patent No.: US 7,834,996 B2
(45) Date of Patent: Nov. 16, 2010

(54) INSPECTION APPARATUS AND METHOD

(75) Inventors: Yoshiharu Momonoi, Kanagawa-ken (JP); Kazuki Taira, Tokyo (JP); Tatsuo Saishu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 142 days.

(21) Appl. No.: 12/347,106

(22) Filed: Dec. 31, 2008

(65) Prior Publication Data
US 2009/0174880 A1 Jul. 9, 2009

(30) Foreign Application Priority Data
Jan. 7, 2008 (JP) ............................ P2008-000598

(51) Int. Cl.
*G01N 21/00* (2006.01)
(52) U.S. Cl. .................... 356/239.3; 356/614; 382/154; 348/59
(58) Field of Classification Search ......... 356/601–623, 356/239.1–239.3; 382/106, 154, 287; 348/59, 348/141; 359/462, 710
See application file for complete search history.

(56) References Cited
U.S. PATENT DOCUMENTS
6,462,871 B1 * 10/2002 Morishima .................. 359/463

7,433,110 B2 * 10/2008 Momonoi et al. ........ 359/209.1
7,586,662 B2 * 9/2009 Momonoi et al. ........ 359/209.1
2007/0057145 A1 3/2007 Momonoi et al.
2008/0239065 A1 * 10/2008 Momonoi et al. ............. 348/49
2009/0168054 A1 * 7/2009 Choi .......................... 356/125
2010/0073463 A1 * 3/2010 Momonoi et al. ............. 348/47

FOREIGN PATENT DOCUMENTS
JP 07-140041 6/1995
JP 2006-112991 4/2006
JP 2007-102201 4/2007

* cited by examiner

*Primary Examiner*—Hoa Q Pham
(74) *Attorney, Agent, or Firm*—Finnegan, Henderson, Farabow, Garrett & Dunner, L.L.P.

(57) ABSTRACT

An optical plate having an exit pupil array or a lens array aligned at a predetermined pitch is disposed at the front of a display. A test pattern is supplied to the display to light a pixel corresponding to the predetermined pitch. A first optical element transmits a light from an inspection position of the optical plate. A second optical element coaxially disposed on the first optical element, focuses the light from the first optical element. An image from the light focused at the second optical element is obtained. A three-dimensional position at the inspection position of the optical plate relative to the display or a predetermined period of the optical plate is calculated from a position and a period of luminance distribution of the image, and a distance between the optical plate and the first optical element. Whether the three-dimensional position or the predetermined period is within a threshold is inspected.

10 Claims, 16 Drawing Sheets

INSPECTION APPARATUS AND METHOD

CROSS-REFERENCE TO RELATED APPLICATIONS

This application is based upon and claims the benefit of priority from Japanese Patent Application No. 2008-000598, filed on Jan. 7, 2009; the entire contents of which are incorporated herein by reference.

FIELD OF THE INVENTION

The present invention relates to inspection apparatus and method for inspecting an apparatus for reconstructing a three-dimensional image.

BACKGROUND OF THE INVENTION

Recently, in order to display an image having different directivity, a method for realizing this function with a hologram or a lens array is used. Especially, an apparatus for displaying a three-dimensional image using a electronic display is proposed.

For example, in order to extract a defect of the hologram, by lighting the hologram with vertical illuminating, an inspection apparatus for obtaining the reflected light (image) by a telecentric optical system is proposed (JP-A No. 2006-112991 . . . patent reference 1).

In order to inspect accuracy of a lenticular sheet using a moire, by overlapping a base pitch image (having high accuracy patterning) with the lenticular sheet, an inspection apparatus for analyzing an observed image is proposed (JP-A No. 2005-140041 . . . patent reference 2). Furthermore, in order to obtain a three-dimensional image, an input apparatus for scanning using a special optical system is proposed (JP-A No. 2007-102201 . . . patent reference 3).

However, in the patent reference 1, all directivity of the hologram is obtained by rotating the hologram. Accordingly, the measurement time and a size of the inspection apparatus become a problem. Furthermore, in case of the three-dimensional image displaying apparatus radiating itself, the illuminating is unnecessary while an image generating means is necessary.

In the patent reference 2, accuracy of each part of a three-dimensional image display apparatus can be relatively obtained. However, with regard to the three-dimensional image display apparatus combined with each part, a three-dimensional positional shift cannot be inspected. Furthermore, in the patent reference 3, an analysis means and a display means for inspection are not actually disclosed.

SUMMARY OF THE INVENTION

The present invention is directed to an apparatus and a method for inspecting a three-dimensional positional shift and an accuracy of parts of an optical plate of the three-dimensional image displaying apparatus.

According to an aspect of the present invention, there is provided an apparatus for inspecting a three-dimensional image displaying apparatus having a display and an optical plate disposed at the front of the display, the apparatus comprising: a signal generation unit configured to supply a test pattern to the display to light a pixel corresponding to a predetermined pitch; a first optical element configured to transmit a light from an inspection position of the optical plate on which the test pattern is displayed; a second optical element coaxially disposed on an optical axis of the first optical element, configured to focus the light from the first optical element; an imaging unit configured to obtain an image from the light focused by the second optical element; and an analysis unit configured to calculate a three-dimensional position at the inspection position of the optical plate relative to the display or a predetermined period of the optical plate, from a position and a period of luminance distribution of the image, and a distance between the optical plate and the first optical element, and to inspect whether the three-dimensional position or the predetermined period is within a threshold; wherein the display has pixels two-dimensionally aligned, and the optical plate has an exit pupil array or a lens array aligned at the predetermined pitch.

According to another aspect of the present invention, there is also provided a method for inspecting a three-dimensional image displaying apparatus having a display and an optical plate disposed at the front of the display, the method comprising: supplying a test pattern to the display to light a pixel corresponding to a predetermined pitch; transmitting a light from an inspection position of the optical plate on which the test pattern is displayed, via a first optical element; focusing the light from the first optical element, at a second optical element; obtaining an image from the light focused at the second optical element, by an imaging unit; calculating a three-dimensional position at the inspection position of the optical plate relative to the display or the predetermined period of the optical plate, from a position and a period of luminance distribution of the image, and a distance between the optical plate and the first optical element; and inspecting whether the three-dimensional position or the predetermined period is within a threshold; wherein the display has pixels two-dimensionally aligned, and the optical plate has an exit pupil array or a lens array aligned at a predetermined pitch.

DETAILED DESCRIPTION OF THE EMBODIMENTS

Figure 1:
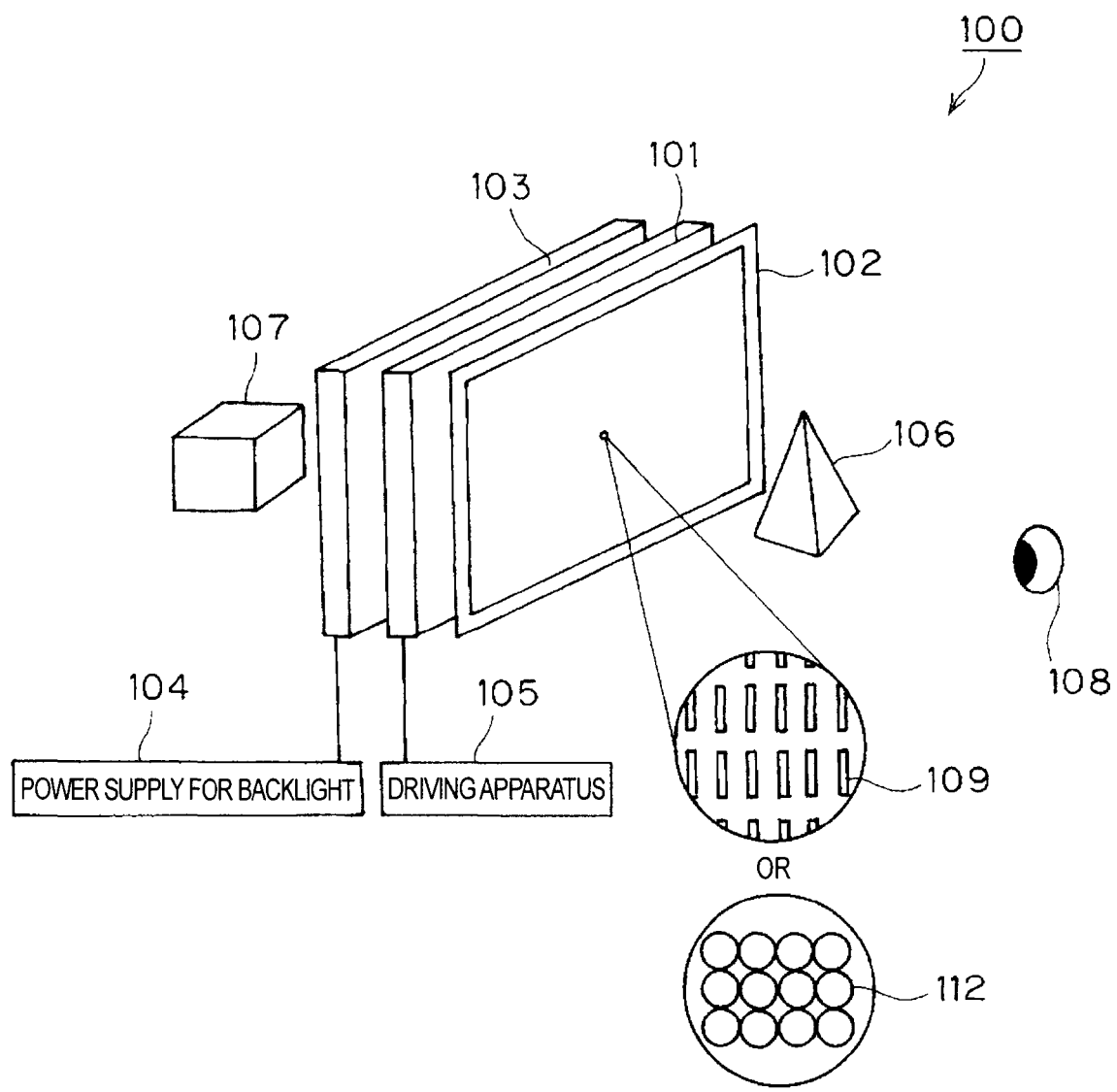
FIG. 1 is a schematic diagram of a displaying apparatus according to the first embodiment.

Hereinafter, various embodiments of the present invention will be explained by referring to the drawings. The present invention is not limited to the following embodiments.

An inspection apparatus 10 of the first embodiment is explained by referring to the drawings. When a three-dimensional image displaying apparatus 100 (Hereinafter, it is called "displaying apparatus") displays a three-dimensional image, the inspection apparatus 10 obtains parallax information of three-dimensional object (Hereinafter, it is called "parallax information") necessary for displaying, and inspects the displaying apparatus 100. Accordingly, before explaining the inspection apparatus 10, the displaying apparatus 100 is explained.

[A] The Displaying Apparatus 100:

First, various embodiments of the displaying apparatus for displaying a three-dimensional image are explained by referring to FIGS. 1~4.

Figure 2:
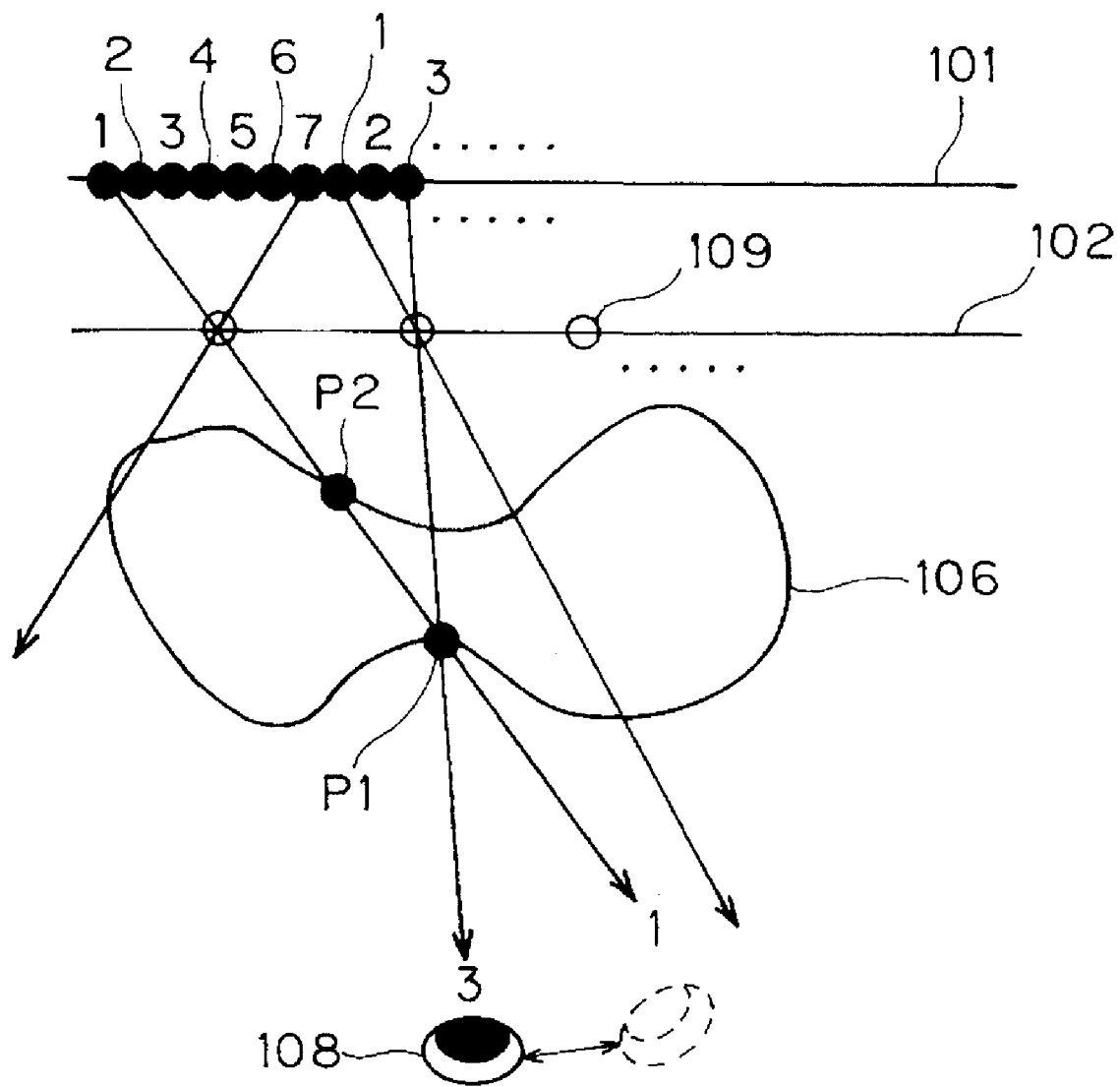
FIG. 2 is a schematic diagram of relationship between the displaying apparatus and a three-dimensional image.
Figure 4:
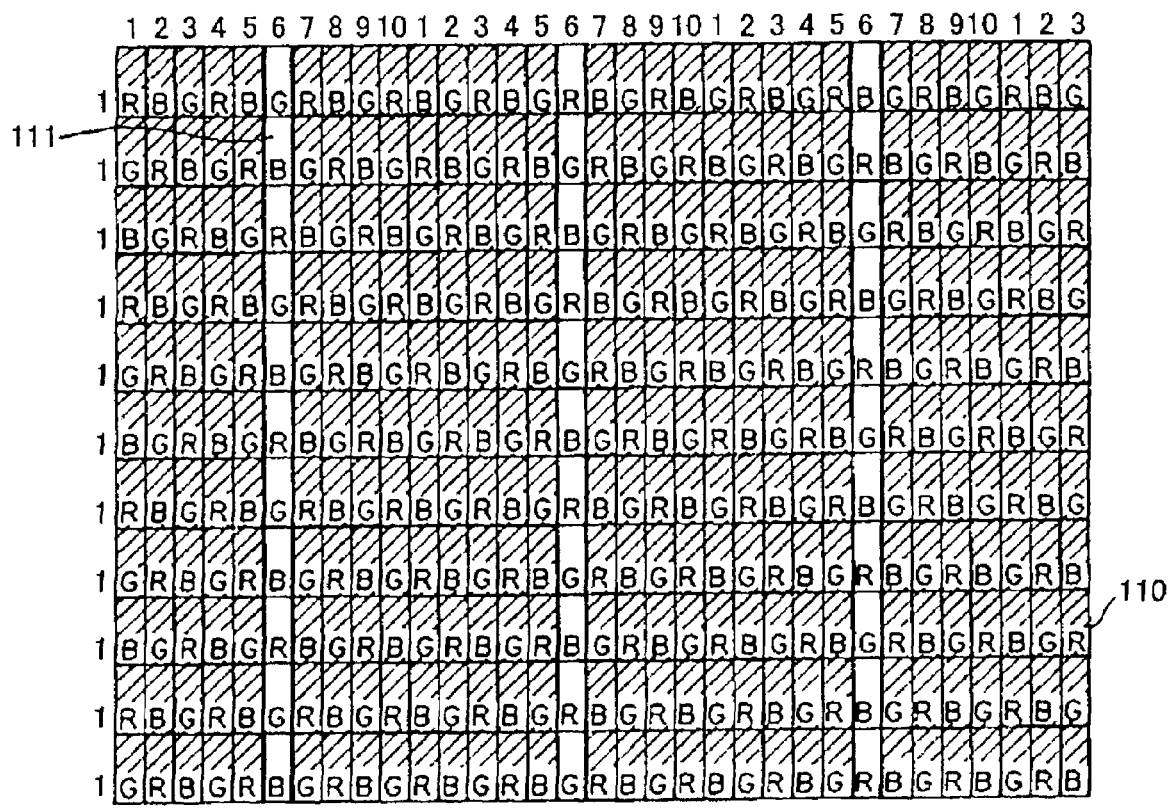
FIG. 4 is a schematic diagram of pixels on a liquid crystal display.

(1) The Displaying Apparatus 100 of the First Embodiment:

The displaying apparatus 100 of the first embodiment is explained by referring to FIGS. 1, 2 and 4.

(1-1) Component of the Displaying Apparatus 100:

FIG. 1 is a schematic diagram showing component of the displaying apparatus 100. A liquid crystal display 101 has a color liquid crystal screen on which sub-pixels of three-primary colors (RGB) are aligned in matrix plain condition (explained afterwards). The liquid crystal display 101 is electrically driven by a driving apparatus 105, and parallax information is displayed on each line of the screen.

A backlight is disposed at the rear of the liquid crystal display 101. By supplying an electric power from a power source 104 for backlight, a light radiated from the backlight 103 illuminates a screen of the liquid crystal display 101.

A pinhole array plate 102 is disposed at the opposite side of the backlight 103, i.e., in a space between the screen of the liquid crystal display 101 and a viewer 108. By light exited from a pinhole array 109 of the pinhole array plate 102, a three-dimensional real image 106 is displayed and recognized by a viewing eye 108. Furthermore, by tracing the light along the reverse direction of the real image 106 from the pinhole array plate 102, a three-dimensional virtual image 107 can be displayed. Furthermore, the three-dimensional image can be continuously displayed at the front and rear of the pinhole array plate 102. Instead of the pinhole array 109, a micro lens array 112 may be used.

(1-2) Displaying Method of the Displaying Apparatus 100:

Next, displaying method of the displaying apparatus 100 is explained by referring to FIGS. 1, 2 and 4. The displaying apparatus 100 has following component so that a natural stereoscopic image with high accuracy and without color separation is reconstructed by mixed color RGB.

FIG. 2 is a plan showing a positional relationship between the displaying apparatus 100 and the three-dimensional image 106. The liquid crystal display 101, which is disposed at the rear of the pinhole array plate 102 from the viewer 108, displays parallax images differently viewed from each viewing angle, i.e., a multiple view image. A light radiated from the multiple view image is transformed to many lights of parallax image via any of the pinhole array 109. By gathering these lights, the three-dimensional real image (stereoscopic image) 106 is displayed.

With regard to the liquid crystal display 101 plainly displaying the multi view image, as shown in FIG. 4, the minimum display unit is each sub-pixel of R (red), G (green), and B (blue). The color can be reappeared by three sub-pixels of R, G, and B. Each sub-pixel displays a luminance and color information of a point which a straight line passing at the center of the pinhole array 109 from the sub-pixel crosses a stereoscopic image in a display space. In general, the straight line passing the same pinhole array 109 from the same sub-pixel crosses the stereoscopic image at a plurality of points. However, one cross point nearest to the viewer side is set as a display point. For example, in FIG. 2, the display point is not a point P2 but a point P1 nearer to the viewing eye 108.

Figure 3:
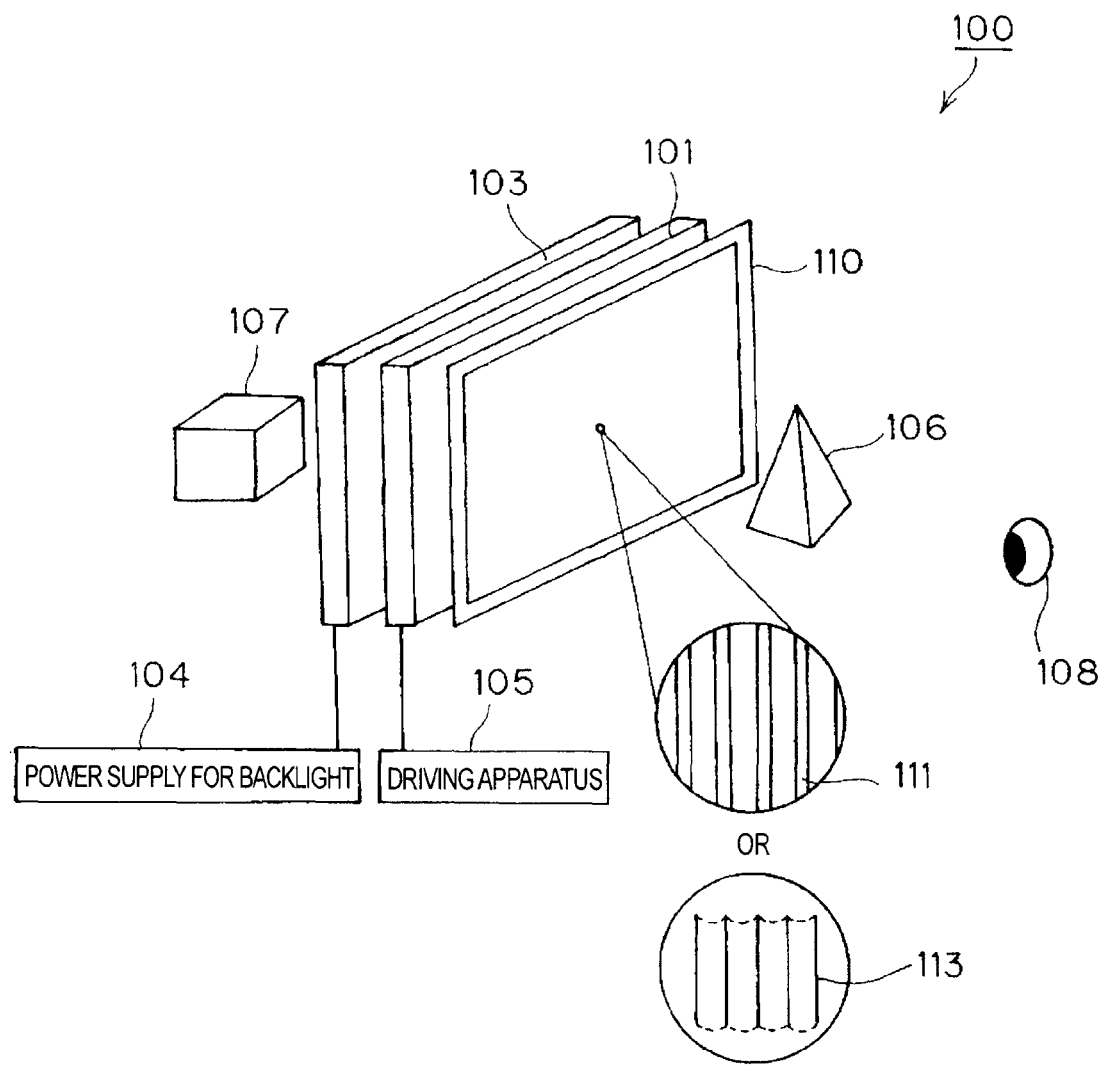
FIG. 3 is a schematic diagram of a displaying apparatus according to the second embodiment.

(2) The Second Embodiment of the Displaying Apparatus 100:

The second embodiment of the displaying apparatus 100 is explained by referring to FIGS. 3 and 4. FIG. 3 is a schematic diagram showing component of a displaying apparatus 100 having a slit array plate 110 instead of the pinhole array 102 in FIG. 1. In this case, the slit array plate 110 has a plurality of holes (slit 111) formed along a vertical direction (or a horizontal direction). FIG. 4 shows a front view of the slit array plate 110.

In case of using the slit array plate 110, a refractive index along vertical direction is very little, and parallax along vertical direction is not taken into consideration. The slit array plate 110 is easily manufactured than the pinhole array 102. In the same way as the pinhole array 102, a natural stereoscopic image having high accuracy without color separation can be displayed. Furthermore, instead of the slit array plate 110, a lenticular sheet 113 comprising a plurality of cylindrical lens having a curvature along horizontal direction or vertical direction may be used.

[B] The Inspection Apparatus 10:

Next, the inspection apparatus 10 is explained by referring to FIGS. 5~20.

(1) Meaning of the Inspection Apparatus 10:

With regard to the displaying apparatus 100, by displaying pixels (disposed based on parallax information) behind the pinhole array 102, the parallax information is displayed.

In the displaying apparatus 100, a light direction is determined by a three-dimensional position of an optical plate (ex. 109, 110, 111, 112, 113) relative to a liquid crystal display 101 (two-dimensional image display), and a pitch of the optical plate. The optical plate is an exit array (pinhole array or slit array) or a lens array (micro lens array or lenticular sheet). In order to uniformly align pixels, the three-dimensional position of the optical plate 109~113 relative to the liquid crystal display 101, and an accuracy of pitch (lens pitch or exit pupil pitch) of the optical plate 109~113 are important.

Figure 5:
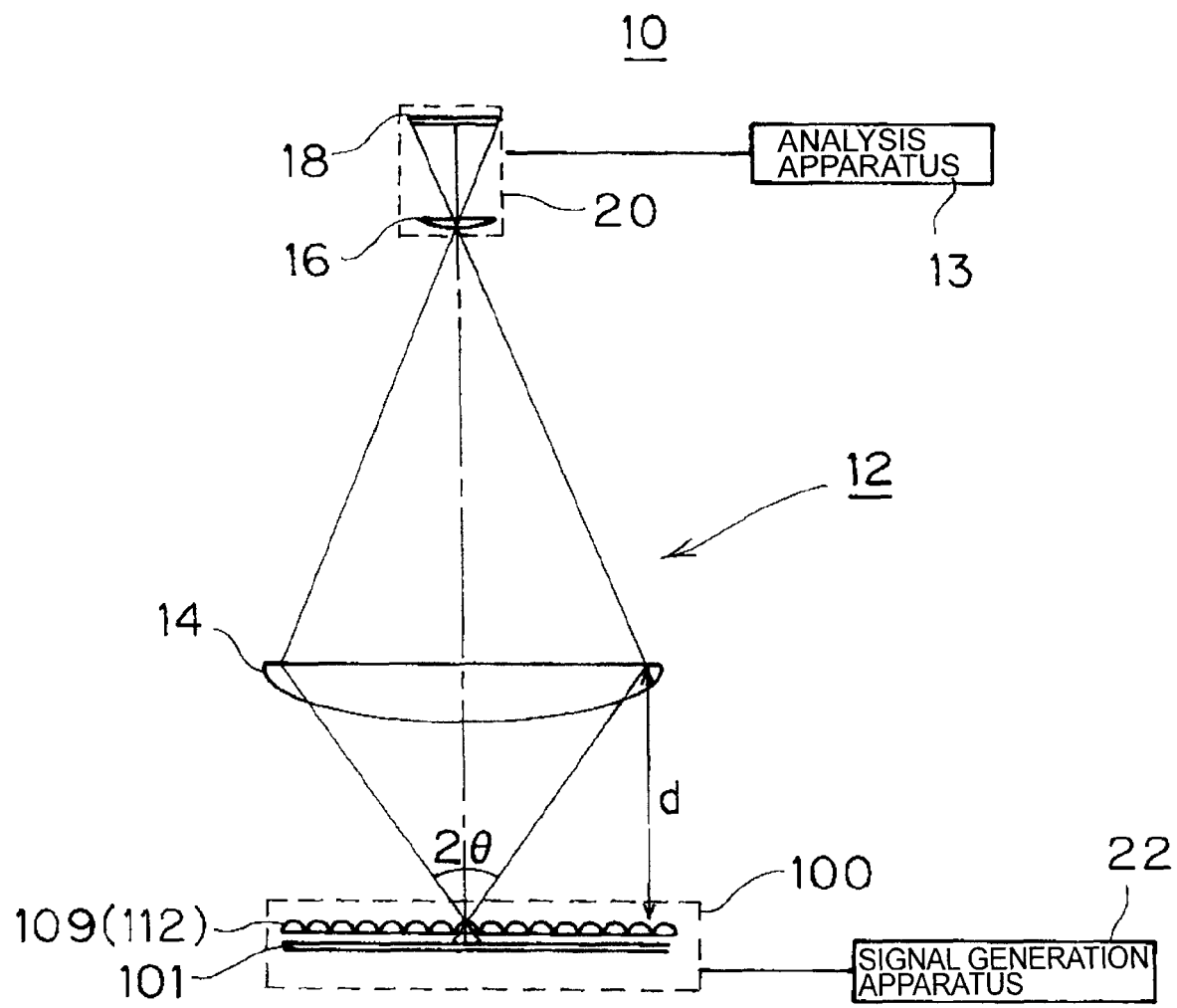
FIG. 5 is a schematic diagram of an inspection apparatus according to the first embodiment.

In the inspection apparatus 10, as shown in FIG. 5, the liquid crystal display 101 displays a test pattern supplied from a signal generation apparatus 22. This display information having directivity of the test pattern is obtained as an image corresponding to a viewing angle via the optical plate 109. By analyzing the image, the three-dimensional position of the optical plate 109~113 relative to the liquid crystal display 101, and the accuracy of pitch of the optical plate 109~113 are measured.

(2) The First Embodiment of the Inspection Apparatus 10:

The inspection apparatus of the first embodiment is explained by referring to FIG. 5.

(1) Component of the Inspection Apparatus 10:

The inspection apparatus 10 includes an optical imaging system 12, and an analysis apparatus 13 for analyzing an inspection image as a three-dimensional image (from the displaying apparatus 100) photographed by the optical imaging system 12. As the analysis apparatus 13, an image processing circuit and the signal generation apparatus 22 which makes the displaying apparatus 100 display a test pattern are included. This image processing circuit can be replaced with a computer having an image processing program. The signal generation apparatus 22 also can be replaced with an image signal-transmitter by the computer having an image creation program.

(2) Explanation of the Optical Imaging System 12:

As shown in FIG. 5, the optical imaging system 12 includes a lens 14, and a camera 20 having a focus lens 16 and a photoelectric transducer 18.

The photoelectric transducer 18 of the camera 20 is disposed at post stage of the focus lens 16. As the photoelectric transducer 18, a CCD (Charge-Coupled Device) or a CMOS (Complementary Metal Oxide Semiconductor) may be used. In this case, the CCD 18 is used.

Figure 7:
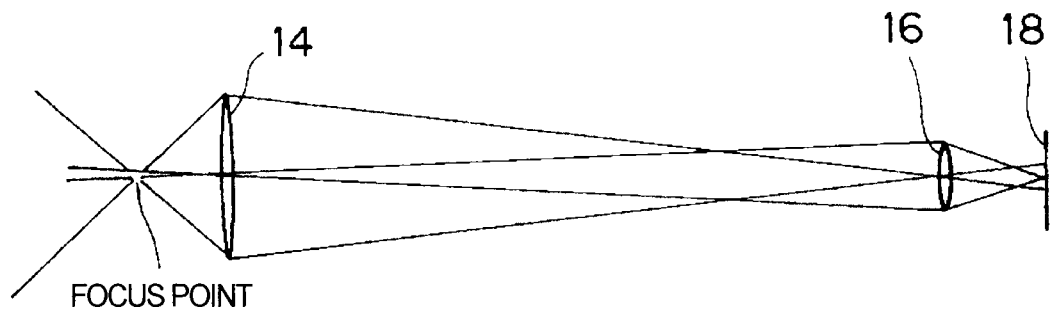
FIG. 7 is a schematic diagram of an optical imaging system of the inspection apparatus according to the first embodiment.

FIG. 7 shows a schematic diagram of the optical imaging system 12. In the optical imaging system 12, an image is photographed by the focus lens 16 and the CCD 18 via the lens 14. A distance between the lens 14 and the focus lens 16 is longer than a focal distance of the lens 14, and one of a focus point of the lens 14 contains a point of real image of focus lens 16 with reverse ray tracing. By placing an object at the focus point and photographing the object, an angle distribution of one point (corresponding to a position of the image) on the object is taken. In the inspection apparatus 10, the displaying apparatus 100 is located at the focus point, and inspection is operated by obtaining parallax information as the image.

Figure 6:
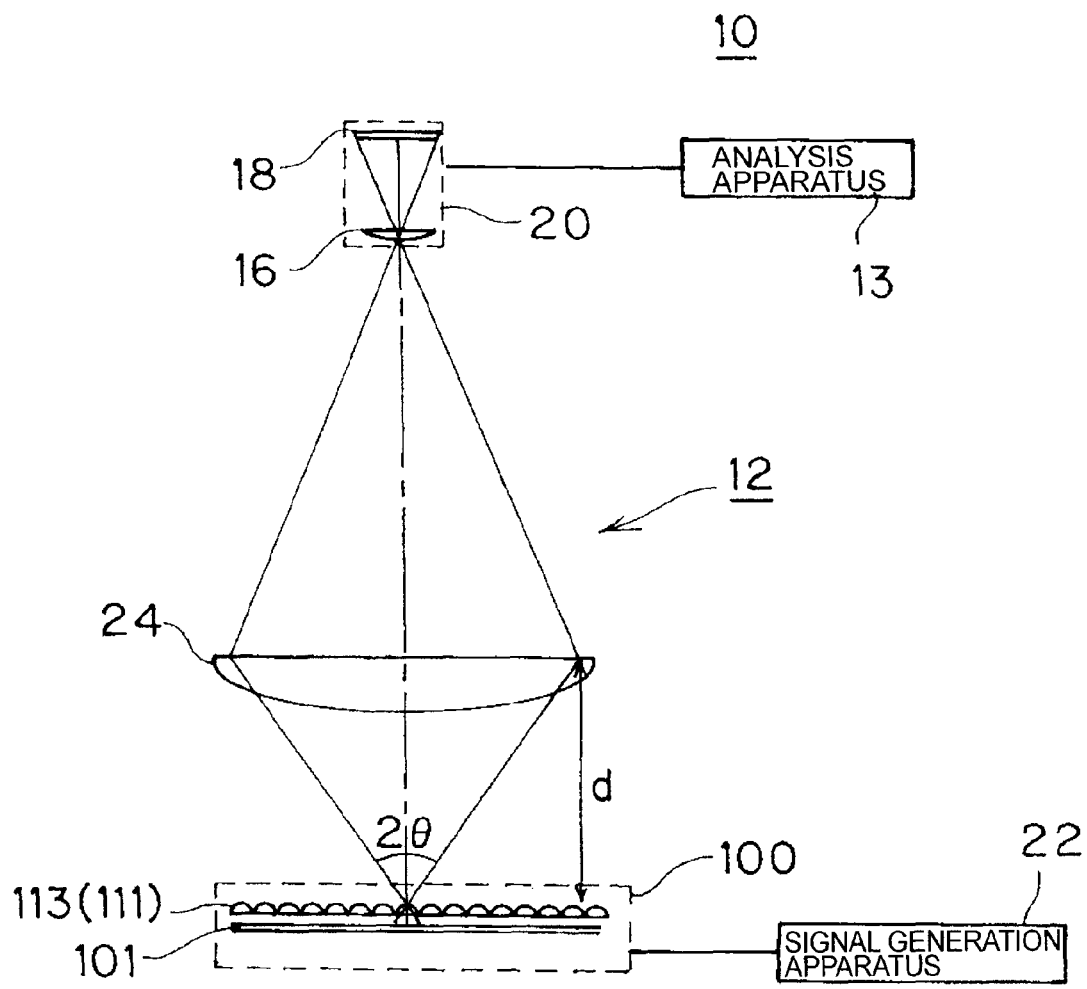
FIG. 6 is a schematic diagram of the inspection apparatus according to the second embodiment.
Figure 8:
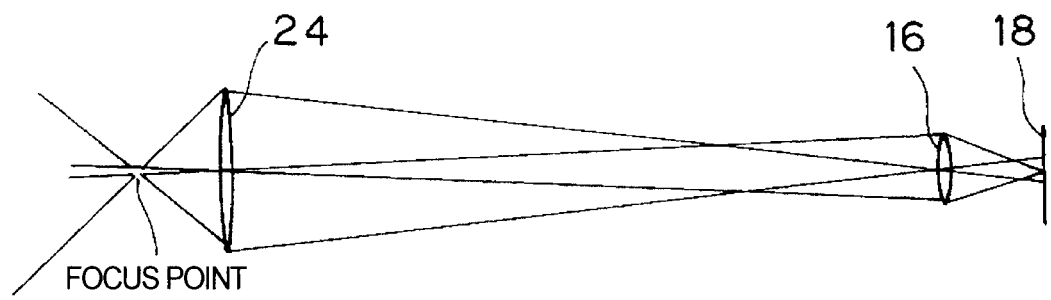
FIG. 8 is a schematic diagram of an optical imaging system of the inspection apparatus according to the second embodiment.

In case that a parallax direction of the displaying apparatus 100 has two-dimensional parallax such as the pinhole array 109 or the micro lens array 112, the lens 14 is used as shown in FIGS. 5 and 7. Furthermore, in case that a parallax direction of the displaying apparatus 100 has one-dimensional parallax such as the lenticular sheet 113 or the slit array 111, a cylindrical lens 24 is used instead of the lens 14 as shown in FIGS. 6 and 8.

(3) A Moving Apparatus 26:

Next, in order to inspect an entire face of the image display (the optical plate) of the displaying apparatus 100, a moving apparatus 26 for changing a relative position between the displaying apparatus 100 and the optical imaging system 12 is explained. In this case, as the camera 20, a video camera to record a moving picture (photographed with moving) is used.

Figure 9:
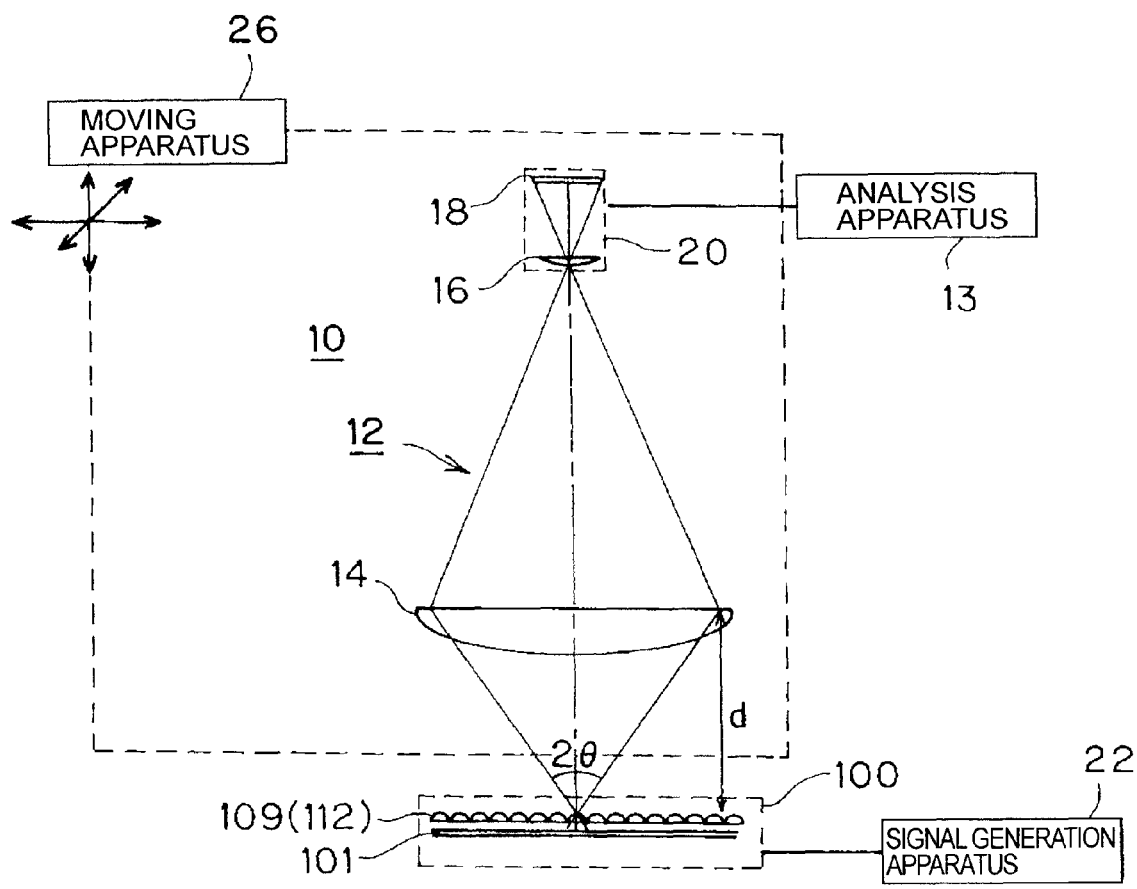
FIG. 9 is a schematic diagram of a moving apparatus having a first component added to the inspection apparatus of the first embodiment.

(3-1) The First Component:

FIG. 9 is a block diagram of the inspection apparatus 10 including the moving apparatus 26 of the first component. In order to change a relative position between the displaying apparatus 100 and the optical imaging system 12, the moving apparatus 26 moves the optical imaging system 12 as shown in FIG. 9.

Figure 10:
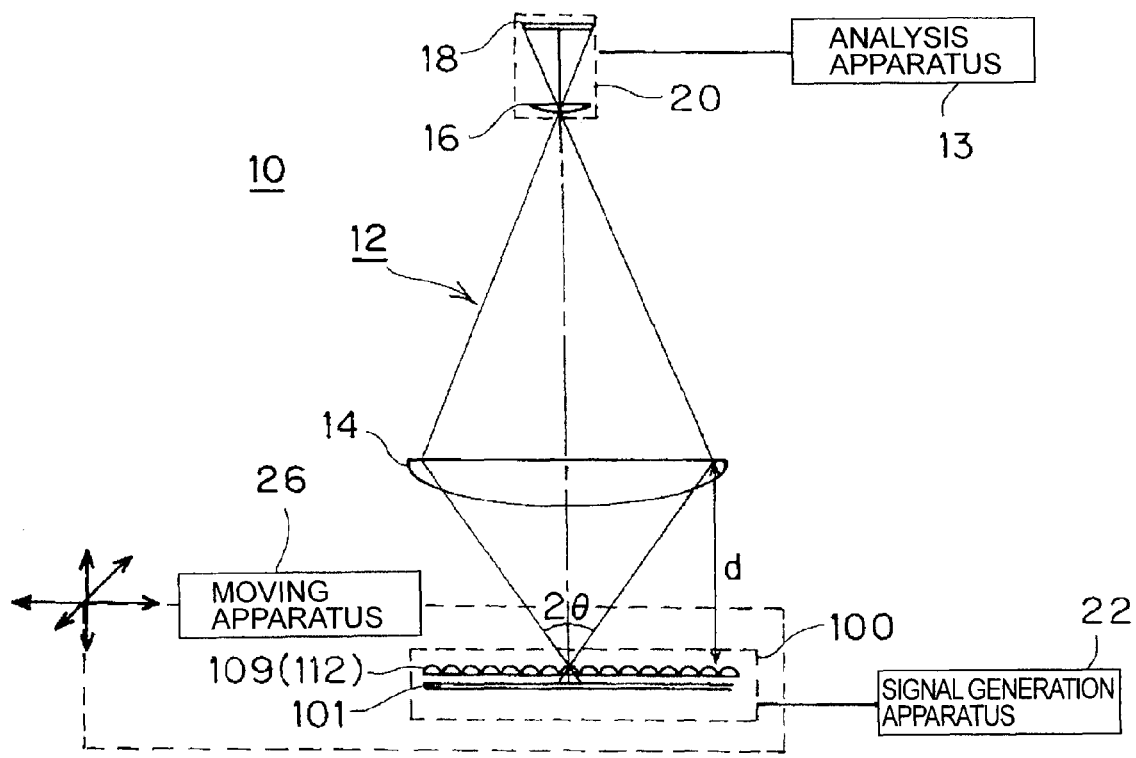
FIG. 10 is a schematic diagram of a moving apparatus having a second component added to the inspection apparatus of the first embodiment.

(3-2) The Second Component:

FIG. 10 is a block diagram of the inspection apparatus 10 including the moving apparatus 26 of the second component. In order to change a relative position between the displaying apparatus 100 and the optical imaging system 12, the moving apparatus 26 moves the displaying apparatus 100 as shown in FIG. 10. The second component is equivalent to the first component of FIG. 9.

(3-3) The Third Component:

With regard to the moving apparatus 26 of the third component, the displaying apparatus 100 is moved along parallax direction. The optical imaging system 12 is moved to adjust a relative distance between the optical imaging system 12 and the displaying apparatus 100 and adjust a position along non-parallax direction.

Figure 11:
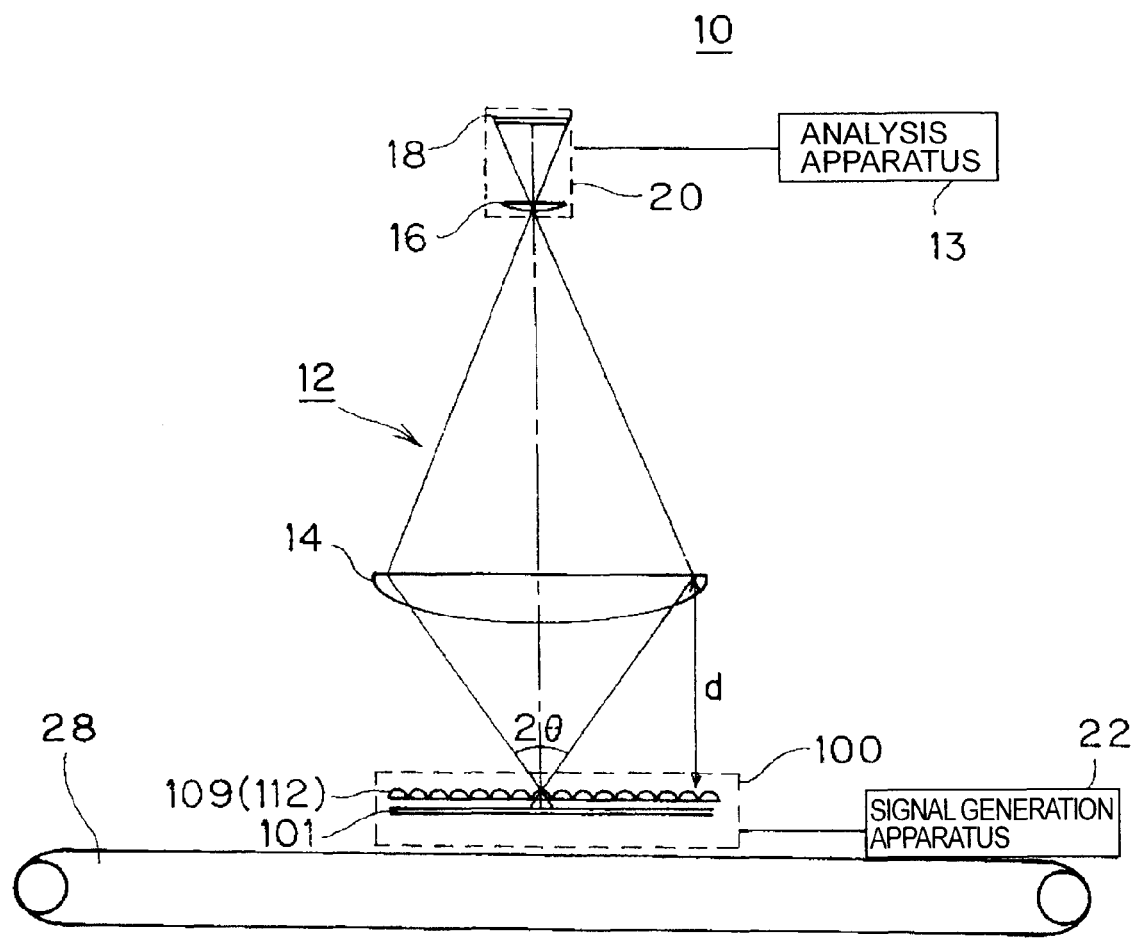
FIG. 11 is a schematic diagram of a moving apparatus having a third component added to the inspection apparatus of the first embodiment.

(3-4) The Fourth Component:

With regard to the moving apparatus 26 of the fourth component, as shown in FIG. 11, the displaying apparatus 100 connected with the signal generation apparatus 22 is moved by a belt conveyer 28, and the image is photographed and inspected.

Figure 12A:
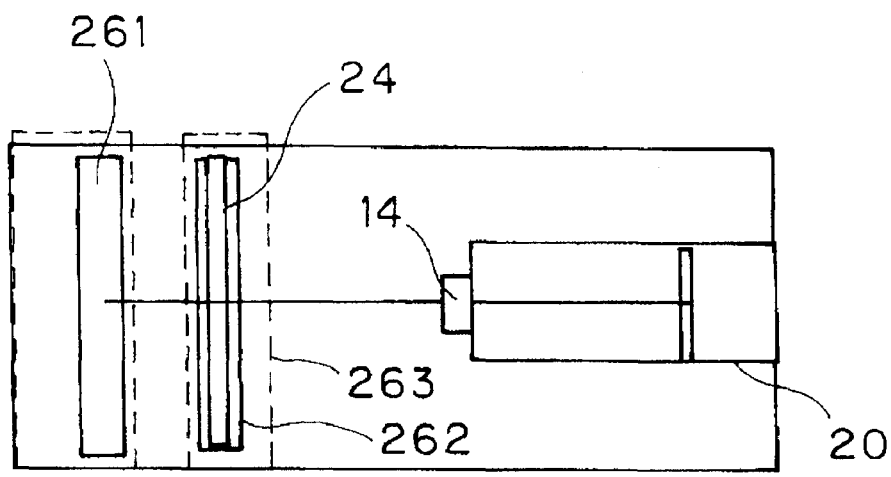
FIGS. 12A and 12B are schematic diagrams of a moving apparatus having a fifth component added to the inspection apparatus of the first embodiment.
Figure 12B:
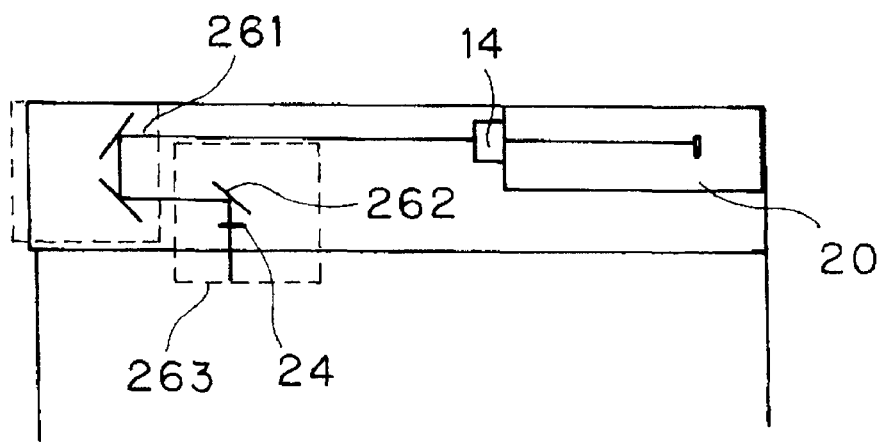

(3-5) The Fifth Component:

With regard to the moving apparatus 26 of the fifth component, as shown in FIGS. 12A and 12B, an entire face of the image display (the optical plate) is scanned using three mirrors. FIG. 12A shows a plan view of the inspection apparatus 10, and FIG. 12B shows a side view of the inspection apparatus 10.

Briefly, a mirror unit 261 of 180° reflection (two mirrors combined) and a mirror unit 262 of 90° reflection (one mirror) are prepared. The mirror unit 262 and the cylindrical lens 24 are moved as one body by a scan head 263. The mirror unit 261 is moved along the same direction by a half moving speed of the mirror unit 262. In this case, an optical path length from the lens 14 does not change while the scan head 263 is moving.

Figure 13:
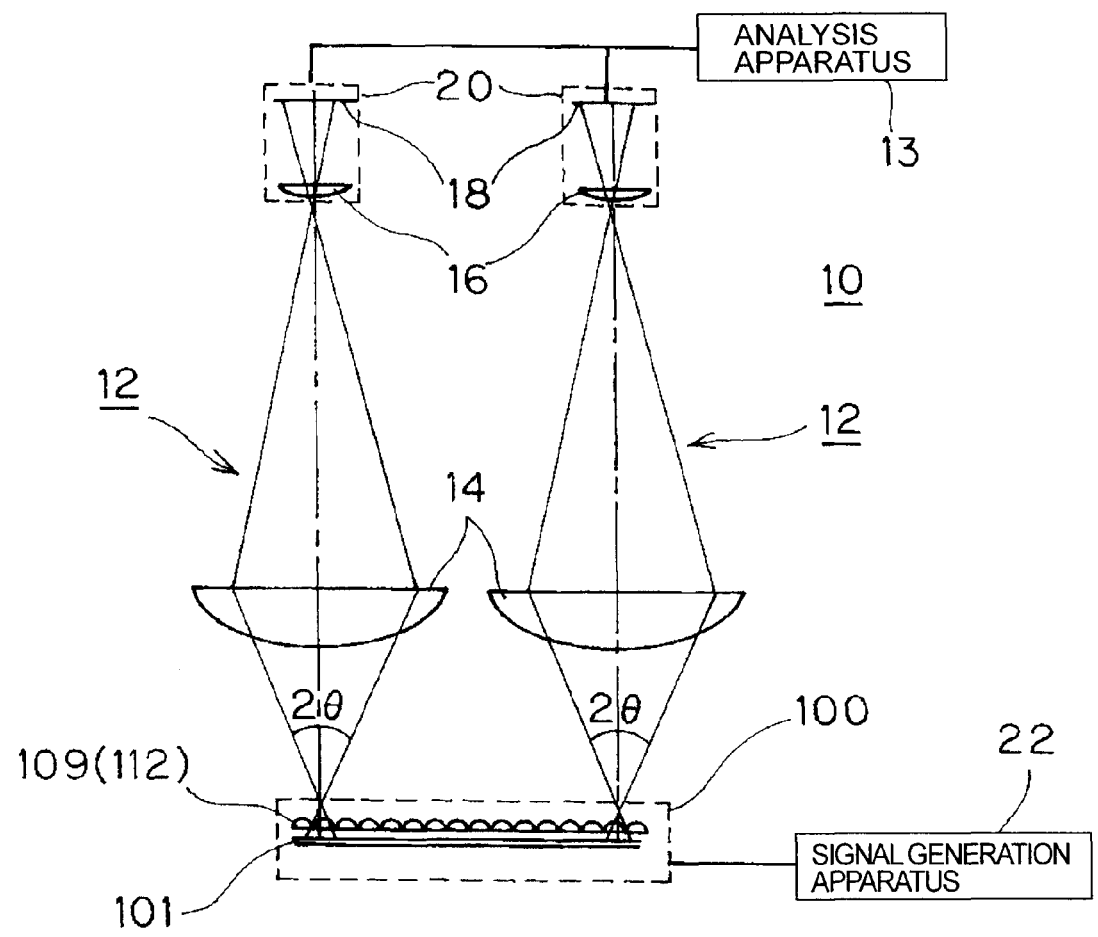
FIG. 13 is a schematic diagram of a moving apparatus having a sixth component added to the inspection apparatus of the first embodiment.

(3-6) The Sixth Component:

With regard to the sixth component (without the moving apparatus 26), as shown in FIG. 13, two optical imaging systems 12 are used in order to obtain a plurality of positional information at one time.

(4) Analysis Method for Inspection:

Next, analysis method for inspecting the displaying apparatus 100 (using the inspection apparatus 10) is explained. In this case, the analysis method for the displaying apparatus 100 having one-dimensional parallax is explained. However, this method can be applied to the displaying apparatus 100 having two-dimensional parallax.

Figure 14:
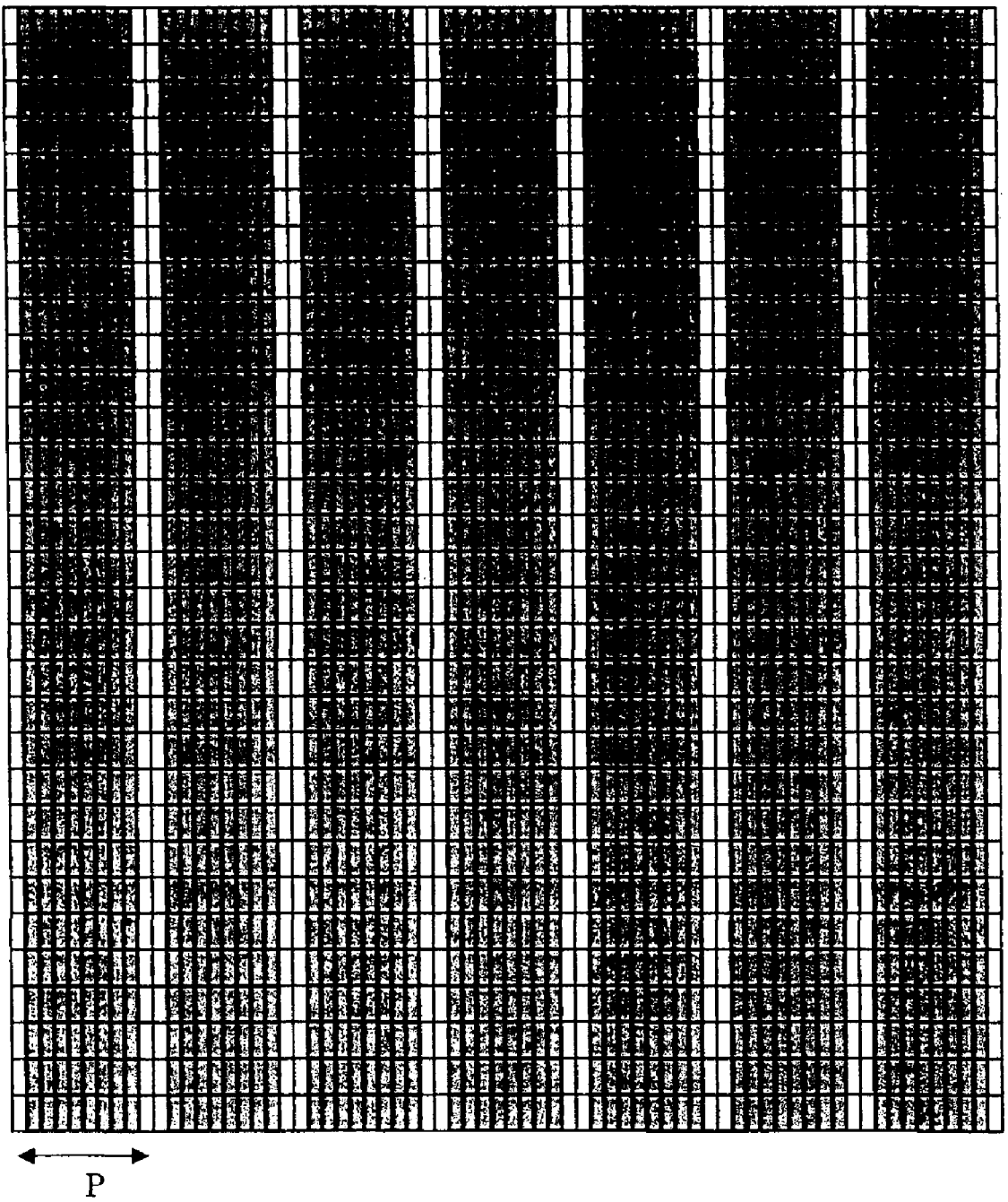
FIG. 14 is a schematic diagram of a test pattern.
Figure 15:
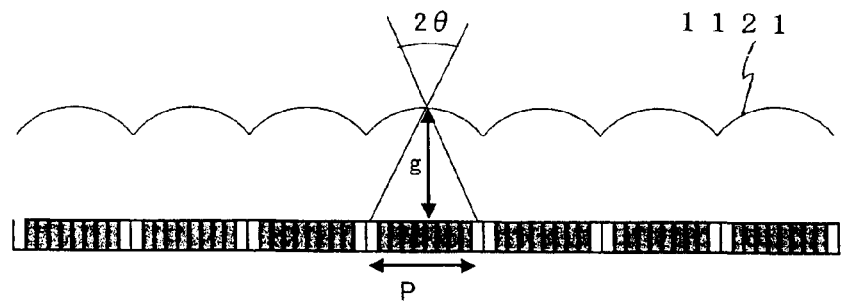
FIG. 15 is a schematic diagram of a gap between the liquid crystal display and a lenticular sheet.

(4-1) Inspection Along Normal Line Direction:

With regard to the lenticular sheet 112 and the liquid crystal display 101, a positional shift along normal line direction is explained by referring to FIGS. 14, 15 and 16.

As a test pattern to be displayed on the displaying apparatus 100, as shown in FIG. 14, an image having a predetermined pitch is displayed on the liquid crystal display 101. In this case, as shown in FIG. 15, lighting is operated at the same pixel pitch as a lens pitch (a valley position) of the lenticular sheet 112. As a result, a light having an angle from the pixel pitch position to an exit pupil (a principal point) of one lens 1121 of the lenticular sheet 112 is displayed via the exit pupil.

Figure 16A:
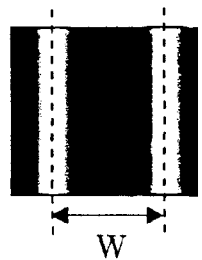
FIGS. 16A and 16B are schematic diagrams of images obtained by the inspection apparatus.

When this test pattern is displayed, the image is obtained as shown in FIG. 16A. In FIG. 16a, a distribution of the angle displayed via the exit pupil of one lens 1121 is measured as a width on the image. The width is W, a distance between the cylindrical lens 24 and the displaying apparatus 100 is d. In this case, a display angle 2θ is represented as follows.

$$2\theta = 2\tan^{-1}(W/2d) \quad (1)$$

A distance between the principal point of the lenticular sheet 112 and a pixel of the liquid crystal display 101 is g, and a lighting period (the pixel pitch) of the test pattern is P. In this case, a relationship between the display angle 2θ and the distance g is represented as follows.

$$2\theta = 2\tan^{-1}(P/2g) \quad (2)$$

Accordingly, the distance g along normal line direction between the lenticular sheet 112 and the liquid crystal display 101 is represented as follows.

$$g = dP/W \quad (3)$$

Figure 16B:
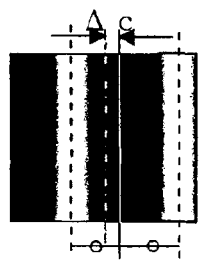
Figure 17:
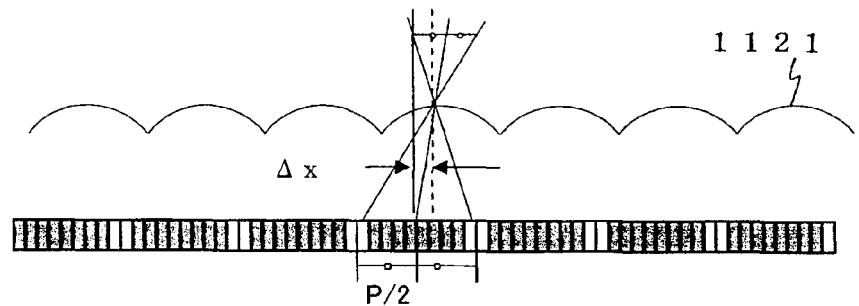
FIG. 17 is a schematic diagram of a gap having a lens shift between the liquid crystal display and the lenticular sheet.
Figure 18:
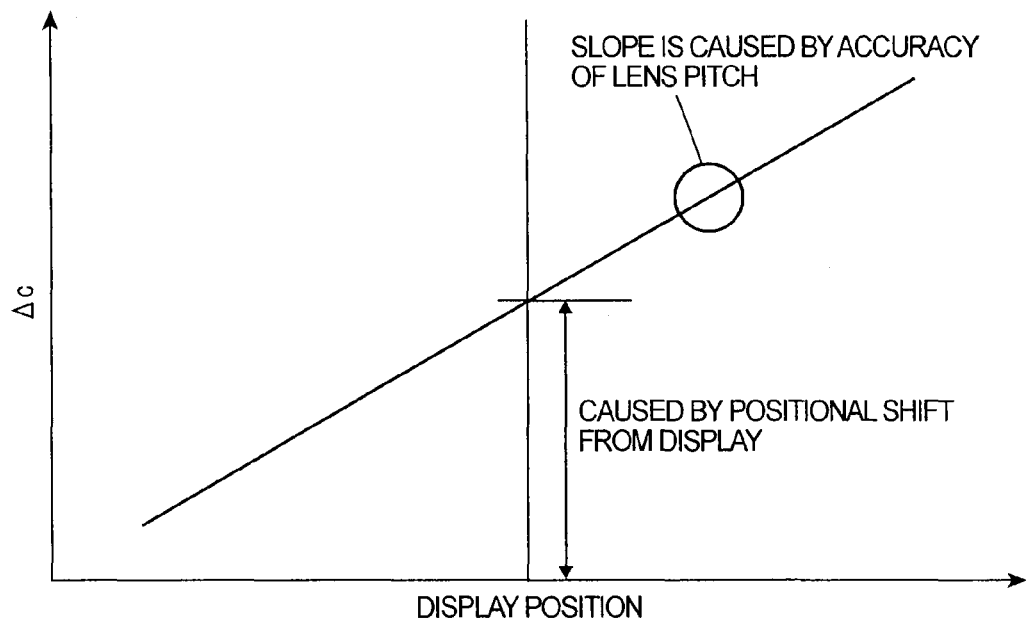
FIG. 18 is a graph showing a positional relationship between a display position of the liquid crystal display and a lens shift Δc.

(4-2) Inspection of Positional Shift along Tangent Direction:

Next, a positional shift along tangent direction of the lenticular sheet 112 and the liquid crystal display 101 is explained by referring by FIGS. 16, 17 and 18. The positional shift along tangent direction for a screen of the liquid crystal display 101 can be analyzed based on a lens pitch pattern of the lenticular sheet 112.

As shown in FIG. 17, if the lenticular sheet 112 is shifted from the test pattern along tangent direction, a pitch pattern having the width W in FIG. 16A is also shifted on the image. As shown in FIG. 16B, a positional shift Δc on the image represents that a light from the displaying apparatus 100 is shifted along tangent direction of each lens of the lenticular sheet 112. By using the positional shift Δc, a shift quantity x relative to the lenticular sheet 112 is represented as follows.

$$\Delta x = \Delta c \cdot g/d \quad (4)$$

The shift quantity Δx also represents a shift between a lens pitch structure of the lenticular sheet 112 and a pixel pitch of the liquid crystal display 101. The shift quantity Δx can be observed as a function for the measurement position on the liquid crystal display 101.

FIG. 18 shows relationship between the positional shift Δc and a display position of the liquid crystal display 101. As shown in FIG. 18, by inspecting the image corresponding to a center part on the liquid crystal display 101, the relative positional shift is observed. By calculating a correlative coefficient between the positional shift Δc and at least two display points of the liquid crystal display 101, the pitch shift of the lenticular sheet can be measured.

(4-3) Inspection of Rotation Shift Around Normal Direction:

If the lenticular sheet 112 rotates around a normal line direction on the liquid crystal display 101, it can be observed that an angular shift between a pitch structure direction of the lenticular sheet 112 and a pitch structure direction of test pattern on the liquid crystal display 101. It can be measured by the angular shift along non-parallax direction in the image. These parameters (Δc, W) are scale values on an actual space. Practically, as to the scale value on the actual space, these parameters need to match with the pixel value by calibration.

Figure 19:
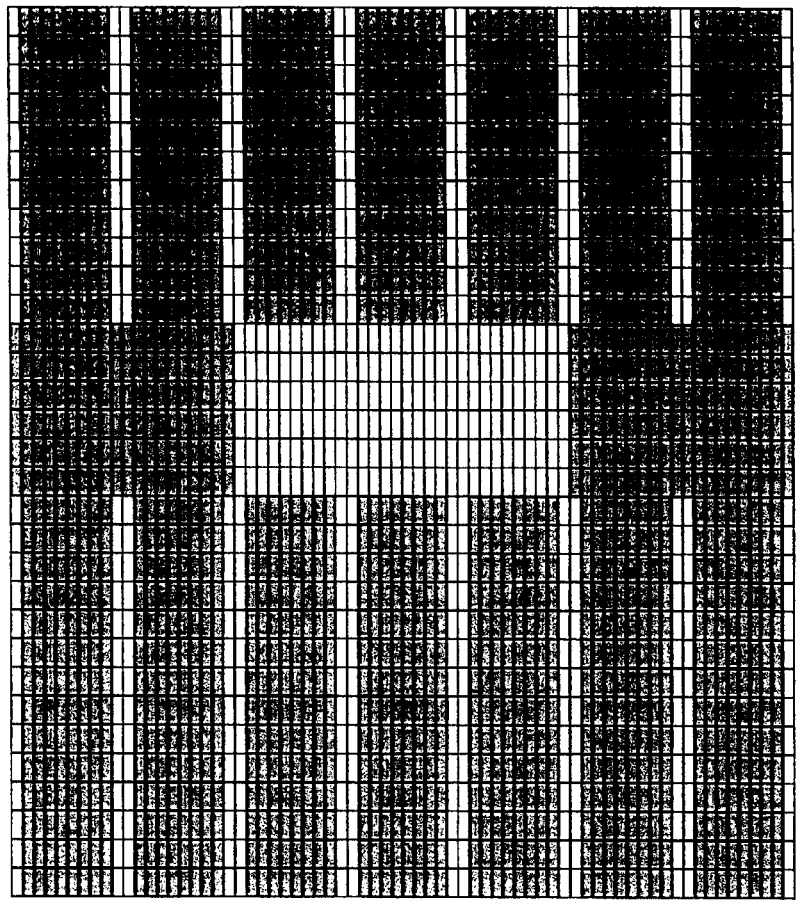
FIG. 19 is a schematic diagram of a test pattern having a marker for adjusting a focus position.

(5) Adjustment of the Inspection Apparatus 10:

If a distance between the displaying apparatus 100 and the focus lens 16 of the optical imaging system 12 is not correct, i.e., if an image from the focus lens 16 is focused by the lens 14 at the exit pupil of the lenticular sheet, the inspection apparatus 10 cannot correctly measure. In order to adjust the distance, a method for adjusting a position by a marker is explained by referring to FIGS. 19 and 20. As shown in FIG. 19, a marker image (not having directivity) is displayed as a sufficient wider part than the lens pitch (of the lenticular sheet) on the displaying apparatus 100. By photographing this marker image via the lens 14, the image is observed as shown in FIGS. 20A and 20B.

Figure 20A:
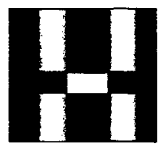
FIGS. 20A and 20B are schematic diagrams of images obtained for adjusting a position between the liquid crystal display and the optical imaging system.
Figure 20B:
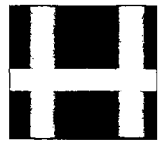

If the distance is not correct, as shown in FIG. 20A, a part of the marker image is only observed along the parallax direction. On the other hand, if the distance is correct, as shown in FIG. 20B, the marker image is extensively observed along the parallax direction. Accordingly, the distance is adjusted until the marker image shown in FIG. 20B is observed.

In the disclosed embodiments, the processing can be accomplished by a computer-executable program, and this program can be realized in a computer-readable memory device.

In the embodiments, the memory device, such as a magnetic disk, a flexible disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for inspecting a three-dimensional image displaying apparatus having a display and an optical plate disposed at the front of the display, the apparatus comprising:
   a signal generation unit configured to supply a test pattern to the display to light a pixel corresponding to a predetermined pitch;
   a first optical element configured to transmit a light from an inspection position of the optical plate on which the test pattern is displayed;
   a second optical element coaxially disposed on an optical axis of the first optical element, configured to focus the light from the first optical element;
   an imaging unit configured to obtain an image from the light focused by the second optical element; and an analysis unit configured to calculate a three-dimensional position at the inspection position of the optical plate relative to the display or a predetermined period of the optical plate, from a position and a period of luminance distribution of the image, and a distance between the optical plate and the first optical element, and to inspect whether the three-dimensional position or the predetermined period is within a threshold;

wherein the display has pixels two-dimensionally aligned, and the optical plate has an exit pupil array or a lens array aligned at the predetermined pitch.

2. The apparatus according to claim 1, further comprising:

an optical imaging unit having the first optical element, the second optical element and the imaging unit;

a moving unit configured to move at least one of the three-dimensional image displaying apparatus or the optical imaging unit;

wherein the analysis unit inspects by moving the inspection position of the optical plate in cooperation with the moving unit.

3. The apparatus according to claim 1, further comprising:

a plurality of optical imaging units each having the first optical element, the second optical element and the imaging unit;

wherein the analysis unit inspects at a plurality of inspection positions of the optical plate using the plurality of optical imaging units.

4. The apparatus according to claim 2 or 3, wherein the analysis unit calculates the three-dimensional position and the predetermined period at each of the plurality of inspection positions.

5. The apparatus according to claim 2, wherein the signal generation unit supplies an image marker to the display, and the analysis unit moves at least one of the three-dimensional image displaying apparatus and the optical imaging unit in cooperation with the moving unit, so that a light corresponding to the image marker from the inspection position of the optical plate is focused at the second optical element via the first optical element along the optical axis.

6. A method for inspecting a three-dimensional image displaying apparatus having a display and an optical plate disposed at the front of the display, the method comprising:

supplying a test pattern to the display to light a pixel corresponding to a predetermined pitch;

transmitting a light from an inspection position of the optical plate on which the test pattern is displayed, via a first optical element;

focusing the light from the first optical element, at a second optical element;

obtaining an image from the light focused at the second optical element, by an imaging unit;

calculating a three-dimensional position at the inspection position of the optical plate relative to the display or the predetermined period of the optical plate, from a position and a period of luminance distribution of the image, and a distance between the optical plate and the first optical element; and inspecting whether the three-dimensional position or the predetermined period is within a threshold;

wherein the display has pixels two-dimensionally aligned, and the optical plate has an exit pupil array or a lens array aligned at a predetermined pitch.

7. The method according to claim 6, further comprising:

moving the three-dimensional image displaying apparatus or an optical imaging unit, the optical imaging unit having the first optical element, the second optical element and the imaging unit;

wherein the calculating step and the inspecting step are executed by moving the inspection position of the optical plate in cooperation with the moving step.

8. The method according to claim 6, wherein the calculating step and the inspecting step are executed at a plurality of inspection positions of the optical plate using a plurality of optical imaging units each having the first optical element, the second optical element and the imaging unit.

9. The method according to claim 7 or 8, wherein the calculating step and the inspecting step are repeated at each of the plurality of inspection positions.

10. The method according to claim 6, further comprising:

supplying an image marker to the display; and moving at least one of the three-dimensional image displaying apparatus and the optical imaging apparatus, so that a light corresponding to the image marker from the inspection position of the optical plate is focused at the second optical element via the first optical element along the optical axis.

* * * * *